United States Patent
Liang

(10) Patent No.: US 9,152,372 B2
(45) Date of Patent: Oct. 6, 2015

(54) METHOD AND SYSTEM FOR ENABLING MULTIPLE VGA CARDS TO PROCESS IMAGE DATA

(75) Inventor: Tiecheng Liang, Guang Dong Province (CN)

(73) Assignee: NVIDIA CORPORATION, Santa Clara, CA (US)

( * ) Notice: Subject to any disclaimer, the term of this patent is extended or adjusted under 35 U.S.C. 154(b) by 1318 days.

(21) Appl. No.: 11/956,274

(22) Filed: Dec. 13, 2007

(65) Prior Publication Data

US 2009/0141467 A1      Jun. 4, 2009

(30) Foreign Application Priority Data

Nov. 29, 2007      (CN) .......................... 2007 1 0195128

(51) Int. Cl.
*G06F 15/16*      (2006.01)
*G06F 3/14*      (2006.01)

(52) U.S. Cl.
CPC .......... *G06F 3/1438* (2013.01); *G09G 2360/06* (2013.01); *Y10T 29/49826* (2015.01)

(58) Field of Classification Search
CPC ......... G06F 3/1438; G06F 3/14; G09G 5/363; G09G 2360/06

USPC ........................................................ 345/520
See application file for complete search history.

(56) References Cited

U.S. PATENT DOCUMENTS 6,587,082 B1 *    7/2003   Moore ............................ 345/1.3
2006/0274073 A1   12/2006  Johnson et al.

OTHER PUBLICATIONS

Translated Office Action, Chinese Pat. App. No. 200710195128.2, dated Feb. 5, 2010.

* cited by examiner

*Primary Examiner* — Hau Nguyen
(74) *Attorney, Agent, or Firm* — Artegis Law Group, LLP

(57) ABSTRACT

A method and system for enabling multiple video graphics array (VGA) cards to process image data are disclosed. Specifically, one embodiment of a graphics system includes a first video graphics array (VGA) card having a first and a second connection ports, a second VGA card having a first and a second connection ports, a third VGA card having a first and a second connection ports, and a connecting device for electronically connecting the first, the second, and the third VGA cards via connections that transfer data. The connecting device is further configured to connect the first connection port of the first VGA card to either the first or the second connection port of the second VGA card and connect the second connection port of the first VGA card to either the first or the second connection port of the third VGA card.

15 Claims, 4 Drawing Sheets

METHOD AND SYSTEM FOR ENABLING MULTIPLE VGA CARDS TO PROCESS IMAGE DATA

CROSS-REFERENCE TO RELATED APPLICATIONS

This application claims the benefit of People's Republic of China Application No. 200710195128.8, filed on Nov. 29, 2007.

BACKGROUND OF THE INVENTION

1. Field of the Invention

The present invention generally relates to graphics technologies, and more particularly, to a method and system for enabling multiple video graphics array (VGA) cards to process image data.

2. Description of the Related Art

Unless otherwise indicated herein, the approaches described in this section are not prior art to the claims in this application and are not admitted to be prior art by inclusion in this section.

With the rising demand for realism and interactivity of computer graphics, having multiple video graphics array (VGA) cards in a computer system to process image data is becoming more and more common. Thus, how to coordinate these VGA cards to yield the optimal performance results is also becoming more and more important. In a conventional graphics system, a connecting device (otherwise referred to as a bridge) is used to electronically connect the VGA cards together.

To illustrate, FIG. 1 is a simplified block diagram of a conventional graphics system 100 having two VGA cards 102 and 104 that are connected through a connecting device 106. Here, each of the two VGA cards 102 and 104 includes a pair of two connection ports 108 and 112 and 114 and 116, respectively. The connecting device 106 can be configured to connect either one of the connection ports 108 and 112 of the VGA card 102 to either one of the connection ports 114 and 116 of the VGA card 104 (e.g., connecting 108 and 114, 112 and 114, 108 and 116, or 112 and 116). Generally, the driver software for the VGA cards 102 and 104 dictate a single unique connection between the two VGA cards that should work and allow the two VGA cards to operate at the same time. So, if the connection between the connection port 108 of the VGA card 102 and the connection port 114 of the VGA card 104 as shown in FIG. 1 is the only working connection, other possible connections between the two VGA cards do not serve any functions of enabling the two VGA cards to communicate with one another.

In other conventional two-VGA-card systems, the VGA card does not support multiple connection ports as discussed above and instead supports only one connection port. With such a single-connection-port VGA card, the two-VGA-card system cannot be expanded to include additional VGA cards to further enhance the processing capabilities of the multi-VGA-card system.

As the foregoing illustrates, what is needed in the art is an improved method and system for enabling multiple VGA cards to operate together and address at least the problems discussed above.

SUMMARY OF THE INVENTION

A method and system for enabling multiple video graphics array (VGA) cards to process image data are disclosed. Specifically, one embodiment of a graphics system includes a first video graphics array (VGA) card having a first and a second connection ports, a second VGA card having a first and a second connection ports, a third VGA card having a first and a second connection ports, and a connecting device for electronically connecting the first, the second, and the third VGA cards via connections that transfer data. The connecting device is further configured to connect the first connection port of the first VGA card to either the first or the second connection port of the second VGA card and connect the second connection port of the first VGA card to either the first or the second connection port of the third VGA card.

At least one advantage of the present invention disclosed herein is to enable two or more VGA cards in a graphics system to operate through one connecting device and to boost the image data processing capability of the graphics system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
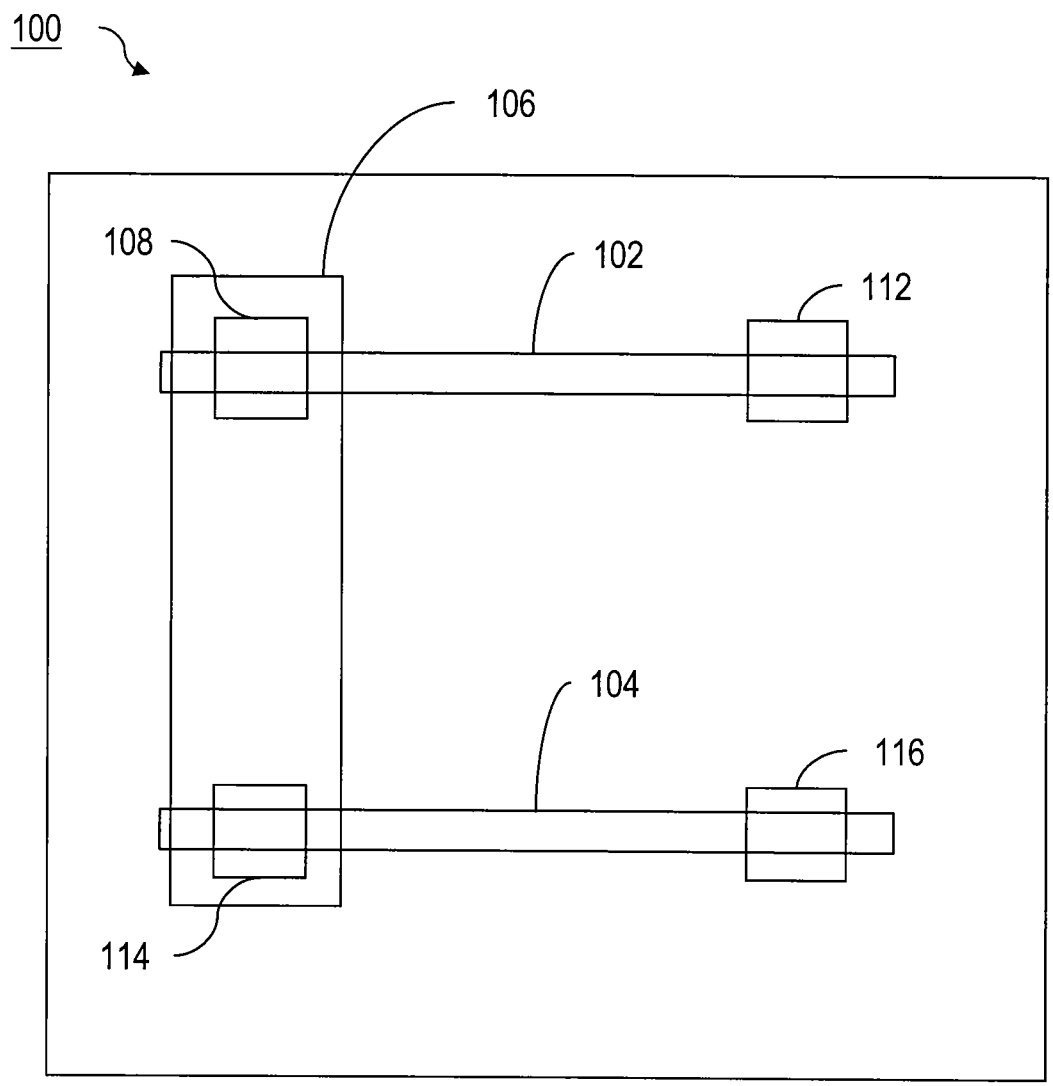
FIG. 1 is a simplified block diagram of a conventional graphics system having two VGA cards that are connected through a connecting device.
Figure 2A:
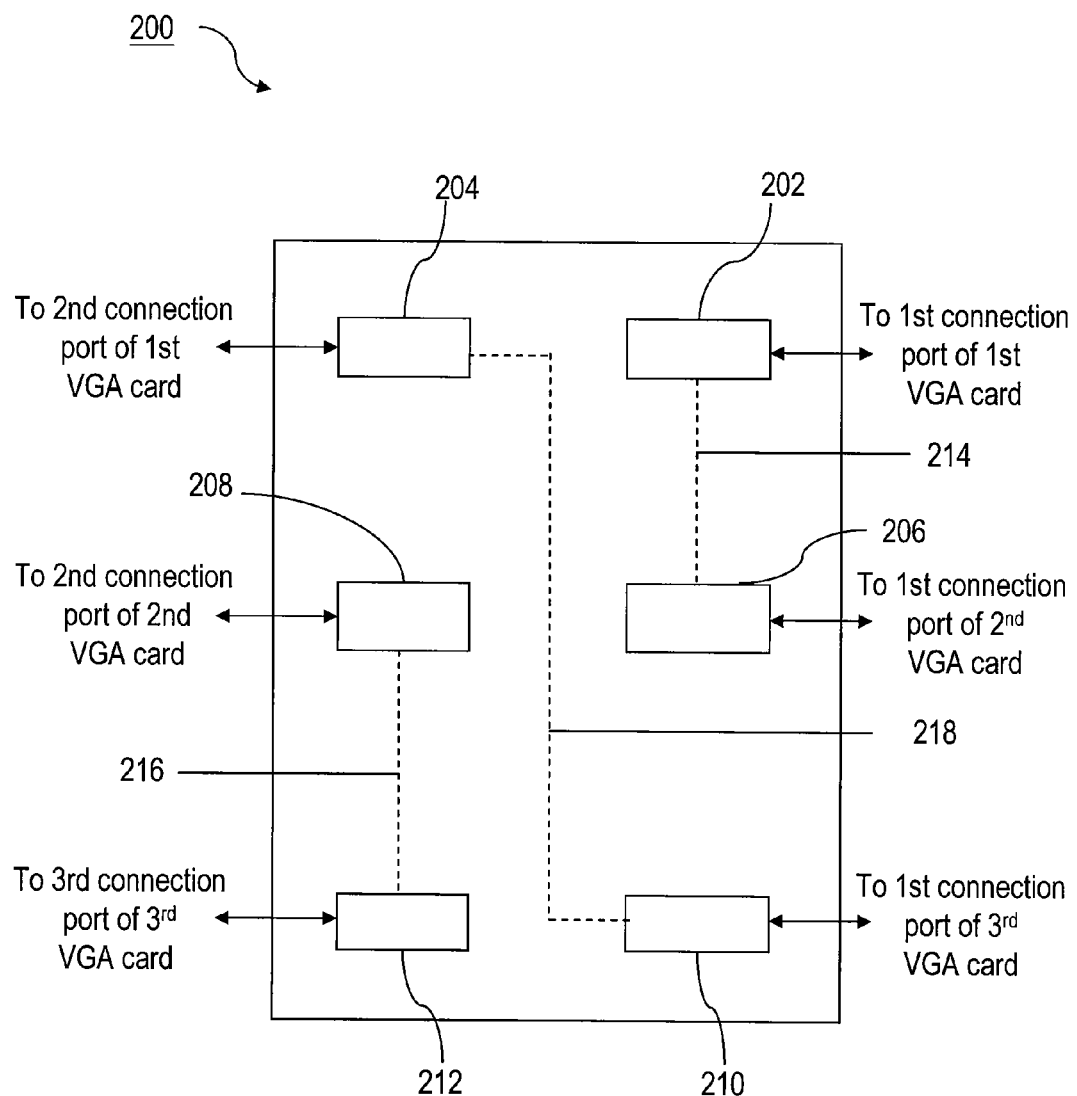
FIG. 2A is a simplified block diagram of a connecting device supporting multiple VGA cards, according to one embodiment of the present invention.

FIG. 2A is a simplified block diagram of a connecting device 200 supporting multiple VGA cards, according to one embodiment of the present invention. To illustrate, suppose we have three VGA cards, each of which has two connection ports thereon. Suppose further that the three VGA cards are connected together via the connecting device. Here, the connecting device 200 has six connectors 202, 204, 206, 208, 210, and 212, each of which is configured to connect with one the connection ports (not shown) on the three VGA cards. The number of connectors of the connecting device 200 varies with respect to the number of VGA cards to be connected to the connecting device 200. In one implementation, the connecting device includes pre-wirings (circuitry/layout) 214, 216, and 218 (shown as dotted lines in FIG. 2B) so that the three VGA cards can be connected via the connection ports and the connecting device 200. Unlike the two-VGA-card system discussed above, it is important to note that every connection established via the connecting device 200 facilitates the communications between any two of the three VGA cards.

To illustrate, in one implementation, the connectors 202 and 204 are configured to connect to the first and the second connection ports of the first VGA card, respectively; another pair of the connectors 206 and 208 are configured to connect to the first and the second connection ports of the second VGA card; and yet another pair of connectors 210 and 212 are configured to connect to the first and second connection ports of the third VGA card. With the pre-wirings 214, 216, and 218, the three VGA cards are electronically connected together in a manner governed by the pre-wirings.

Figure 2B:
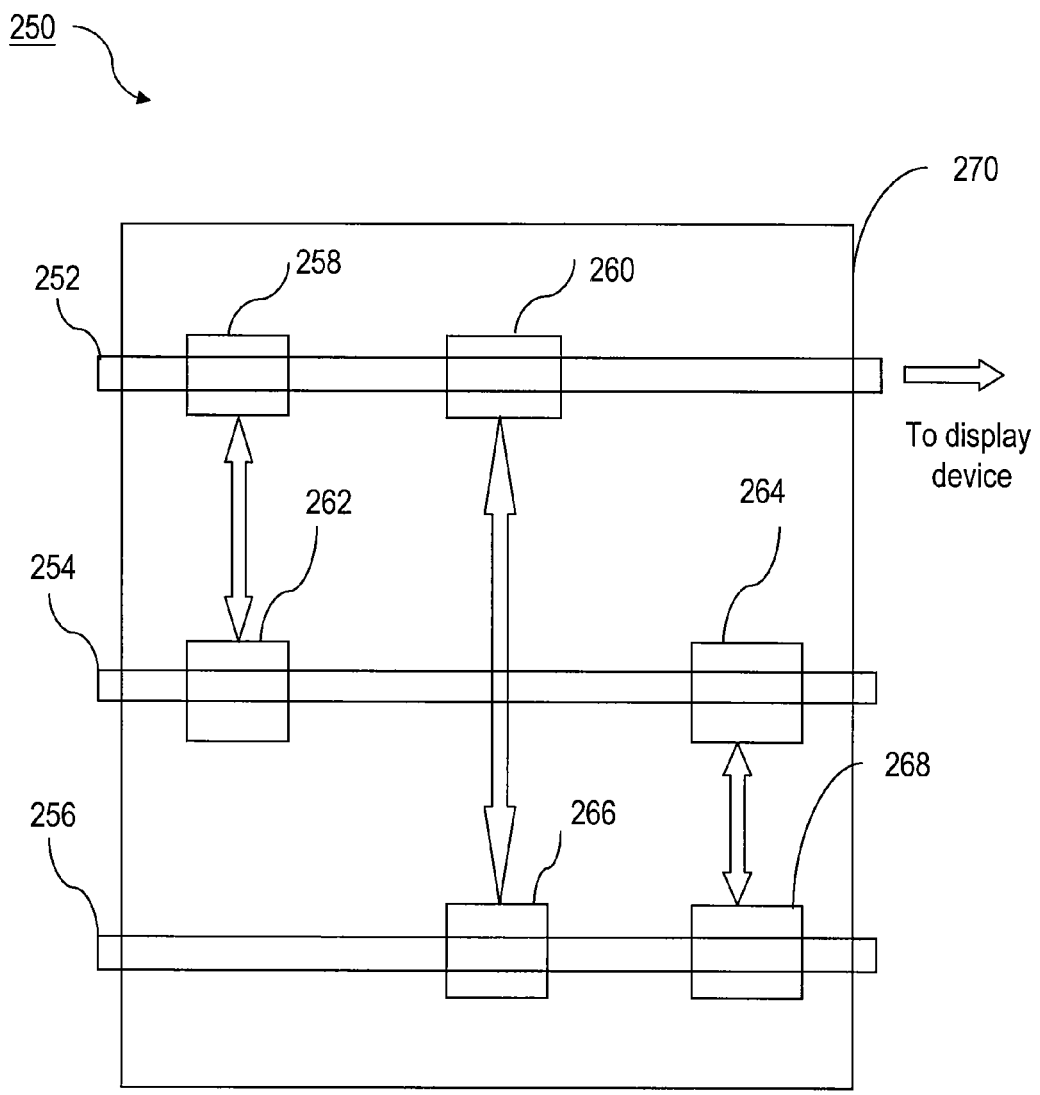
FIG. 2B is a simplified block diagram showing a graphics system configured to support multiple VGA cards, according to one embodiment of the present invention.

In conjunction with FIG. 2A, FIG. 2B is a simplified block diagram showing a graphics system 250 configured to support multiple VGA cards, according to one embodiment of the present invention. The graphics system 250 includes three VGA cards, the first VGA card 252, the second VGA card 254, and the third VGA card 256. Each of these three VGA cards 252, 254, and 256 has at least a pair of two connection ports 258 and 260, 262 and 264, and 266 and 268. In one implementation, these connection ports are preferably multi-use input/output (MIO) ports. The graphics system 250 further includes a connecting device 270 (same as the connecting device 200 shown in FIG. 2A) to electronically connecting the first, the second, and the third VGA cards 252, 254, and 256. In one implementation, the first, the second, and the third VGA cards 252, 254, and 256 preferably are Peripheral Component Interconnect Express (PCIe) based VGA cards.

With the connecting device 270, FIG. 2B mainly shows the connection relationships among the first, the second, and the third VGA cards 252, 254, and 256 through their corresponding connection ports rather than the actual physical wirings among the connection ports. Through the connecting device 270, the first connection port 258 of the first VGA card 252 connects to the first connection port 262 of the second VGA card 254; the second connection port 264 of the second VGA card 254 connects to the second connection port 268 of the third VGA card 256; and the first connection port 266 of the third VGA card 256 connects to the second connection port 260 of the first VGA card 252. It should again be noted that the connection ports shown in FIG. 2B do not necessarily reflect their actual physical locations on the VGA cards.

It should be apparent to a person with ordinary skills in the art to configure the connecting device 270 so that it supports other pre-wirings to enable the three VGA cards to connect in a different way than the connection relationships shown in FIG. 2B. Specifically, if the driver software for the VGA cards and the pre-wirings 214, 216, and 218 are modified, then other connection relationships between any two VGA cards 252, 254, and 256 can be accommodated, subject to at least one limitation. The limitation is that the two connection ports on a VGA card cannot connect to the two connection ports on another VGA card. For example, if the first connection port 258 of the first VGA card 252 connects to the second connection port 264 of the second VGA card 254, then the second connection port 260 of the first VGA card 252 is not allowed to also connect to the first connection port 262 of the same second VGA card 254, according to one embodiment of the present invention. Instead, the second connection port 260 of the first VGA card 252 has to be connected with either the first connection port 266 or the second connection port 268 of the third VGA card 256. This limitation applies even if more VGA cards are added to the multi-VGA card graphics system.

Moreover, in one implementation of the graphics system 250, the first VGA card 252 is configured to be its output VGA card for scanning out the rendered image data to a display device (not explicitly shown). In other words, after the first, the second, and the third VGA cards 252, 254, and 256, respectively finish rendering image data, the rendered image data is scanned out to the display device through a designated VGA card, such as the first VGA card 252. VGA card driver software is responsible for ensuring all the connections among the connection ports 258, 260, 262, 264, 266, and 268 are functioning and facilitating communications of data and commands among the VGA cards. The VGA card driver software is further configured based on the number of the VGA cards that are present and are to be connected to the connecting device 270 in the graphics system 250 and the selection of the VGA card to serve as the output VGA card. After such configuration, the VGA card driver software ensures the image data processed by the non-output VGA cards are sent to the designated output VGA card either directly (such as from the second VGA card 254 to the first VGA card 252) or indirectly (such as from the third VGA card 256 to the second VGA card 254 and then from the second VGA card 254 to the first VGA card 252).

In one implementation, the connecting device 200 shown in FIG. 2A or the connecting device 270 shown in FIG. 2B is a passive device and the layout (pre-wirings) thereof can be adjusted to accommodate different connection relationships among the various VGA cards. In other words, if a set of connection relationships that are different than the ones illustrated and described above, then the pre-wirings on the connecting device need to be modified. In addition, the VGA card driver software also needs to be changed to reflect and support the new set of connection relationships.

Figure 3:
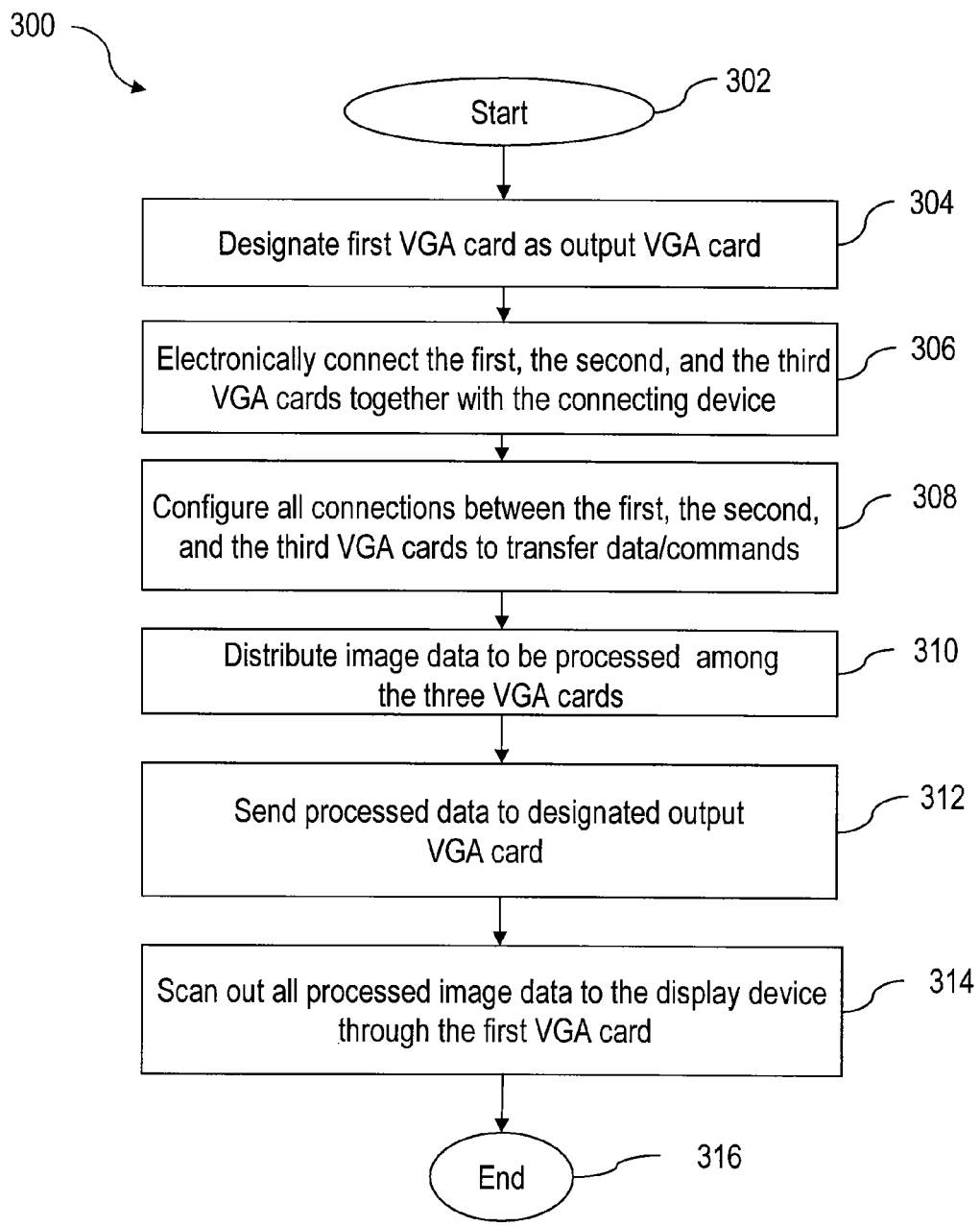
FIG. 3 is a flow chart showing a method of enabling a graphics system to support multiple VGA cards, according to one embodiment of the present invention.

FIG. 3 is a flow chart showing a method 300 of enabling a graphics system to support multiple VGA cards, according to one embodiment of the present invention. In conjunction with FIG. 2B, the method 300 starts in step 302 and designates the first VGA card 252 as an output VGA card. In step 306, the first, the second, and the third VGA cards 252, 254, and 256 are electronically connected together via the connecting device 270. The connection relationships among the three VGA cards, in one implementation are detailed above. In step 308, all the connections among the connection ports of the first, the second, and the third VGA cards 252, 254, and 256 are configured to transfer data and commands among the VGA cards. In step 310, the incoming data are distributed to the first, the second, and the third VGA cards 252, 254, and 256 via the connections for processing. In step 312, the second and the third VGA cards 254 and 256 send their processed image data to the first VGA card 252 directly or indirectly. In step 314, the first VGA card 252 aggregates all the imaged data and scans out a display device connected to it.

The VGA card driver software is responsible for carrying out many of the illustrated steps in FIG. 3. With the driver software managing the traffic among the VGA cards and with the connecting device connecting more than two VGA cards in a manner illustrated and described above, these multiple VGA cards should be able to significantly enhance the overall performance of the multi-VGA-card graphics system.

The above description illustrates various embodiments of the present invention along with examples of how aspects of the present invention may be implemented. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computing device such as CD-ROM disks readable by a CD-ROM drive, DVD disks readable by a DVD drive, ROM chips, or any type of solid-state non-volatile semiconductor memory) on which information is permanently stored; and (ii) writable storage media (e.g., floppy disks within a diskette drive, CD-RW disks, DVD-RW disks, flash memory, hard-disk drive, or any type of solid-state random-access semiconductor memory) on which alterable information is stored. The above examples, embodiments, and drawings should not be deemed to be the only embodiments, and are presented to illustrate the flexibility and advantages of the present invention as defined by the following claims.

I claim:

1. A graphics system comprising:
   a first video graphics array (VGA) card having a first and a second connection ports;
   a second VGA card having a first and a second connection ports;
   a third VGA card having a first and a second connection ports;
   a connecting device for electronically connecting the first, the second, and the third VGA cards via connections that transfer data, wherein the connecting device is configured to:
      connect the first connection port of the first VGA card to the first connection port of the second VGA card,
      connect the second connection port of the second VGA card to the first connection port of the third VGA card, and
      connect the second connection port of the first VGA card to the second connection port of the third VGA card; and
   a software driver to programmatically designate one of the first VGA card, the second VGA card and the third VGA card as an output VGA card.

2. The graphics system of claim 1, wherein the first and second connection ports of the first, the second, and the third VGA cards are multi-use input/output ports (MIO).

3. The graphics system of claim 1, wherein one of the first, the second, and the third VGA cards is designated as an output VGA card to scan out processed image data.

4. The graphics system of claim 3, wherein the output VGA card aggregates processed image data from the first, the second, and the third VGA cards before scanning out to a display device coupled to the output VGA card.

5. The graphics system of claim 4, wherein the image data processed by the second and the third VGA cards can be sent to the output VGA card directly or indirectly through the connections.

6. The graphics system in claim 1 wherein the first, the second, and the third VGA cards are compatible with Peripheral Component Interconnect Express (PCIe) interface.

7. The graphics system of claim 1, wherein the connecting device provides a direct connection between any two of the first VGA card, the second VGA card, and the third VGA card.

8. A method for enabling a multi-video graphics array (VGA) card graphics system to process image data, the method comprises:
   designating, programmatically by a software driver, a first VGA card among the first VGA card, a second VGA card, and a third VGA card in the multi-VGA-card graphics system as an output VGA card; and
   configuring a connecting device in the multi-VGA-card graphics system to establish connections between a first connection port of the first VGA card and a first connection port of the second VGA card, between a second connection port of the second VGA card and a first connection port of the third VGA card, and between a second connection port of the first VGA card a second connection port of the third VGA card, wherein the connections transfer data among the first, the second, and the third VGA cards.

9. The method of claim 8, wherein the first and second connection ports of the first, the second, and the third VGA cards are multi-use input/output ports (MIO).

10. The method of claim 8, further comprising distributing the image data to the first, the second, and the third VGA cards for processing.

11. The method of claim 10, further comprising sending image data processed by the second and the third VGA cards to the output VGA card directly or indirectly through the connections.

12. The method of claim 11, further comprising aggregating processed image data from the first, the second, and the third VGA cards before scanning out to a display device coupled to the output VGA card.

13. The method in claim 8 wherein the first, the second, and the third VGA cards are compatible with Peripheral Component Interconnect Express (PCIe) interface.

14. A graphics system comprising:
   a first video graphics array (VGA) card having a first and a second connection ports;
   a second VGA card having a first and a second connection ports;
   a third VGA card having a first and a second connection ports; and
   a connecting device for electronically connecting the first, the second, and the third VGA cards via connections that transfer data, wherein the connecting device is configured to:
      connect the first connection port of the first VGA card to the first connection port of the second VGA card,
      connect the second connection port of the second VGA card to the first connection port of the third VGA card, and
      connect the second connection port of the first VGA card to the second connection port of the third VGA card.

15. The graphics system of claim 1, wherein the connecting device comprises six connectors, each connector configured to connect with one of the first connection port or the second connection port on one of the first VGA card, the second VGA card, or the third VGA card.

* * * * *